Nov. 1, 1932.   R. R. BROOKS   1,885,679
TOOL AND METHOD OF CONSTRUCTING THE SAME

Filed May 1, 1931

Inventor
Robert R. Brooks

By *Clarence A. O'Brien*
Attorney

Patented Nov. 1, 1932

1,885,679

UNITED STATES PATENT OFFICE

ROBERT R. BROOKS, OF PENSACOLA, FLORIDA

TOOL AND METHOD OF CONSTRUCTING THE SAME

Application filed May 1, 1931. Serial No. 534,399.

This invention relates generally to machine tools, and to a new and novel method of constructing the same whereby great savings in material and labor in constructing the tool are made, without impairing the efficiency of the tool, and certain other advantages and economies achieved which will be recognized from the following description.

It is an object of this invention to provide a tool of the type described and a process by which it is formed by connecting a tool steel stub to a softer metal bar in extension of the stub, whereby the amount of tool steel required in such a tool is reduced as well as the expense and difficulty of constructing the tool.

It is also an object of this invention to teach a method of constructing a tool of the type described wherein a cheaper metal is welded to a tool steel stub.

These and other objects of the invention, its nature, and its composition and arrangement and combination of parts, and the sequence of operations and the steps involved, and the duration of the same, will be evident from a reading of the following descriptions of the drawing, in which.

Figure 1:
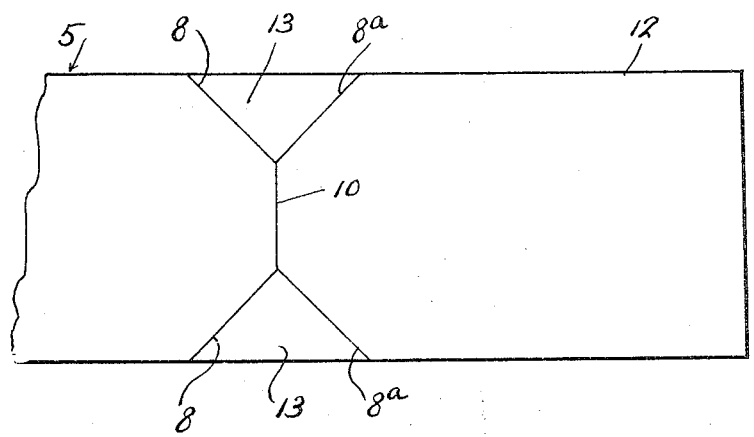
Figure 1 is a general top plan view partly broken away of a tool made in accordance with the principles of the invention.
Figure 2:
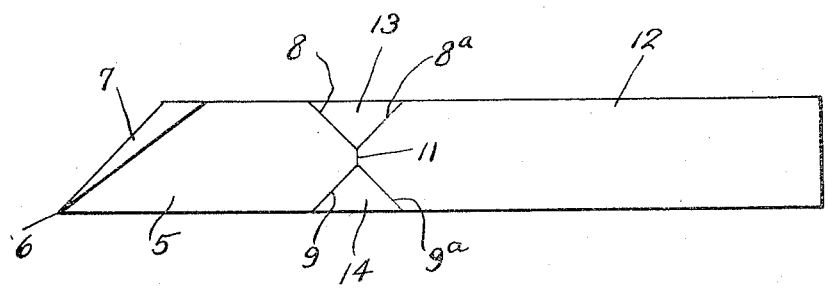
Figure 2 is a side elevational view of such a tool.

Referring in detail to the drawing, the numeral 5 refers generally to a tool steel stub having a conventional cutting point 6 and cutting edge 7 formed in any desired manner. The other end of the tool which is preferably formed of square or rectangular stock, has the corners thereof angularly cut off as at 8 and 9. In case one transverse measurement of the stub is less than another thereof, there will be presented a surface bounded on the top and bottom by the long dimension 10 and bounded at each side by the short dimension 11 the surface being disposed substantially at right angles to the axis of the stub. A relatively soft metal bar generally designated 12, formed from scrap such as material recovered from worn out railroad car wheel tires or driving wheel tires, is drawn or otherwise formed into the same cross section as the stub 5, and at one end of the bar 12 its corners are then cut away as at 8a and 9a as was done at 8 and 9 in the case of the tool steel stub 5.

The process of manufacturing or method of construction consists in forming the tool steel stub and the metal bar 12 with the corners thus cut away, and presenting the bar and the tool steel stub with the surfaces bounded by the lines 10 and 11 in registry, and while maintaining this relationship and alinement, electric welding the two together, and then filling in the angular spaces or voids as at 13 and 14 with weld material, and finishing the same to size. Other methods of welding might also be used.

This construction permits the use of a very small length of tool steel stub, and the stub may be used down to the weld as wear and resharpening reduce its length. The expensive operations of redrawing and reducing tool steel cutters and tools of this general type is thus substituted for by a very much cheaper construction which is equally efficient having a strength comparative to that of tools formed in the usual way.

It is to be definitely understood that I do not desire to limit the application of this invention to the particular modification set out herein and to illustrate the principles thereof, and any change or changes may be made consistent with the spirit and scope of the invention.

What is claimed is:

1. A method of constructing a tool of the type described comprising preparing a tool stub by reducing all of the corners of a squared end thereof, preparing a shank of scrap metal of similar cross section by similarly reducing all of the corners of a squared end thereof, clamping the stub and shank in longitudinal alinement and welding the prepared ends of the stub and shank together, and filling the resultant voids with welding material to the size of the shank and stub.

2. A tool of the type described comprising a hardened tool stub, and a shank of lower grade material of the same cross section, welded in end to end relation, all of the corners of the substantially abutting ends of the stub and shank being angularly cut away to provide on each abutting end a centralized projecting right angularly related surface elongated in the greatest transverse dimension of the said abutting ends, the resulting voids being filled with weld material.

3. A tool of the type described comprising an elongated hardened tool stub and an elongated shank of lower grade material, said stub and shank having similar cross sections and being arranged in longitudinal extension, and both the tool stub and shank having each a square cut end all of the corners of which are angularly cut-away equally to provide on each square cut end a centralized outstanding surface elongated in the greatest transverse dimension of the tool stub and shank, said centralized outstanding surfaces being abutted and welded, the spaces between the remaining portions of the ends being filled with weld material.

4. A device of the class described comprising an elongated shank having a substantially rectangular cross section, a cutter of substantially similar cross section, arranged in longitudinal extension of the shank, and the abutting ends of the shank and cutter being squared, all four corners of the abutting ends of the shank and cutter being angularly cut off and providing faces which slant outwardly toward the axes of the shank and cutter, thereby defining a right angularly related area on each abutting end, said areas being abutted and welded, masses of welding material filling the spaces between the opposed slanting faces of the shank and cutter.

In testimony whereof I affix my signature.

ROBERT R. BROOKS.